United States Patent [19]

Asakura

[11] Patent Number: 5,754,363
[45] Date of Patent: May 19, 1998

[54] CASSETTE LOADING DEVICE

[75] Inventor: Naoki Asakura, Nagaokakyo, Japan

[73] Assignee: Mitsubishi Denki Kabushiki Kaisha, Tokyo, Japan

[21] Appl. No.: 814,696

[22] Filed: Mar. 11, 1997

Related U.S. Application Data

[63] Continuation of Ser. No. 590,676, Jan. 29, 1996, abandoned, which is a continuation of Ser. No. 283,154, Aug. 3, 1994, abandoned.

[30] Foreign Application Priority Data

Aug. 17, 1993 [JP] Japan ................ 5-203461

[51] Int. Cl.$^6$ .................................... G11B 5/448
[52] U.S. Cl. ........................... 360/96.5; 360/85
[58] Field of Search ................ 74/411.5, 530, 74/421 R, 460, 461, 462, 437; 360/96.5, 95, 85

[56] References Cited

U.S. PATENT DOCUMENTS

| | | | |
|---|---|---|---|
| 2,823,561 | 2/1958 | Opocensky | 74/411.5 |
| 3,662,610 | 5/1972 | Thoen | 74/10.2 |
| 4,511,940 | 4/1985 | Yamaguchi et al. | 360/96.6 |
| 4,628,382 | 12/1986 | Okumura | 360/93 |
| 4,685,009 | 8/1987 | Min et al. | 360/95 |
| 4,823,633 | 4/1989 | Pike | 74/411.5 |
| 4,835,636 | 5/1989 | Kanai et al. | 360/96.5 |
| 4,992,895 | 2/1991 | Kim | 360/96.5 |
| 4,996,612 | 2/1991 | Suda | 360/96.5 |
| 5,025,331 | 6/1991 | Hirayama et al. | 360/85 |
| 5,050,022 | 9/1991 | Aizawa | 360/96.5 |

FOREIGN PATENT DOCUMENTS

| | | | |
|---|---|---|---|
| 1201913 | 8/1970 | European Pat. Off. | 74/411.5 |
| 0376281 | 7/1990 | European Pat. Off. | |
| 3530730 | 3/1986 | Germany . | |
| 3832889 | 4/1989 | Germany . | |
| 4135834 | 5/1993 | Germany . | |
| 1220170 | 9/1989 | Japan . | |
| 2-53252 | 2/1990 | Japan | 360/96.5 |
| 2-68756 | 3/1990 | Japan | 360/96.5 |
| 4205754 | 7/1992 | Japan . | |
| 6-168526 | 6/1994 | Japan | 360/96.5 |
| 2210495 | 6/1989 | United Kingdom . | |

*Primary Examiner*—Stuart S. Levy
*Assistant Examiner*—William J. Klimowicz

[57] ABSTRACT

In a cassette loading device according to the invention, a member for transmitting the drive force supplied from a loading motor is formed of a spur gear for facilitating assembly, a stopper is associated to teeth of a spur gear, which is provided for moving a cassette housing, so as to stop the rotation of the spur gear through an angle smaller than 360 degrees without a fail, a plurality of apertures through which light beams are passed to a photosensor are formed at positions in a gear sense corresponding to moving patterns for the purpose of detecting a trailing end of the tape in accordance with various moving patterns of the tape cassette, and a door moving member of an integral type is employed to eliminate a connection to a door for reducing the number of parts for opening and closing a door and thus facilitating the assembly.

15 Claims, 22 Drawing Sheets

CASSETTE LOADING DEVICE

This application is a continuation of application Ser. No. 08/590,676 filed on Jan. 29, 1996, now abandoned; which was a continuation of application Ser. No. 08/283,154 filed on Aug. 3, 1994, now abandoned.

BACKGROUND OF THE INVENTION

1. Field of the Invention

The present invention relates to a cassette loading device of a magnetic recording/reproducing apparatus.

2. Description of Related Art

A cassette loading device in the prior art will be described below. FIG. 1 is a perspective view of a cassette loading device in the prior art, FIG. 2 is an exploded perspective view of the cassette loading device in the prior art, FIG. 3 is a perspective view of a movable part of a cassette housing in the prior art, FIG. 4 is a side view showing a major portion of a cassette housing drive in the prior art, FIG. 5 is a side view of a major portion of gears in FIG. 4, and FIGS. 6A and 6B are side views showing a major portion of a door moving mechanism. In particular, FIG. 6A shows a state where a door is open, and FIG. 6B shows a positional relationship between an arm and the door when the door is closed.

In FIG. 1, a reference number "1" indicates the whole of a cassette loading device, "2" indicates a video tape cassette (which will be referred to merely as a "cassette"), "3" indicates a door, "4" indicates a cassette housing which is moved when it houses the inserted cassette 2, "5" indicates a bottom plate of the cassette housing 4, and "6" indicates the drive force transmitting mechanism which is driven by a loading motor (not shown) for moving the cassette housing 4.

In FIGS. 2, 3, 4 and 5, 5a indicates bosses which are provided at the opposite ends of the bottom plate 5 and are engaged with arms 10. A reference number "7" indicates a top plate, "8" indicates a shaft which is rotated together with an arm lock 9 and arms 10 fixed thereto. A reference number "11" indicates a right side plate, "12" indicates a left side plate, "13" indicates a top plate, "15" indicates a gear drive which is coaxially fixed to a worm gear 16 for driving the arm lock 9. A reference number "17" indicates a worm for driving the worm gear 16. A reference number "18" indicates a gear which is fixed coaxially to the worm 17 and is driven by the unillustrated loading motor. A reference number "20" indicates guide grooves formed at the side plates 11 and 12 for guiding the bosses 5a.

In FIGS. 6A and 6B, "9a" indicates a cam fixed coaxially to the arm lock 9, "19a" and "19b" indicate arms, and "19c" indicates a spring. The arm 19b is provided at its end with an engagement boss 19d which is engaged with an engagement piece 3a of the door 3. The spring 19c forces, as shown in FIG. 6B, the door 3 in the closing direction. When a pushing force is applied to a front surface, the door 3 is pushed and turned upward around the engagement boss 19d. These parts form a door opening/closing mechanism, and the door 3 is opened and closed in accordance with engagement of the cam 9a with the arm 19a.

The operation will now be described below. The inserted cassette 2 is placed on the bottom plate 5, and the unillustrated loading motor is driven, whereby the arm lock 9 is driven to rotate clockwise in FIG. 4, so that the bosses 5a move horizontally along the guide grooves 20, and then move vertically and downward to attain the loading state of the cassette 2.

When the cassette is to be ejected, the operation is performed oppositely to the above, and specifically, the loading motor rotates the arm lock 9 counterclockwise in accordance with an ejection instruction, so that the bosses 5a are raised vertically along the guide grooves 20, and then are moved horizontally for ejecting the cassette 2.

The drive force transmitting mechanism 6 for transmitting the drive force for loading and ejecting the cassette 2 is disposed at the outer side of the right side plate 11. As shown in FIG. 2, many parts are required, which complicates assembly steps and requires a long time for these steps.

The door moving mechanism will now be described below. In FIGS. 6A and 6B, prior to insertion of the cassette 2, the cam 9a is located at a position lower than the illustrated position, and thus is not engaged with the arm 19a. Therefore, the arm 19b is in the lowered position, and the door 3 is closed (see FIG. 6B). As described above, the engagement boss 19d at the end of the arm 19b is engaged with the engagement piece 3a of the door, and the arms 19a and 19b are forced by the spring 19c to close the door 3. When the cassette 2 is inserted, the door 3 is pushed upwardly, and the unillustrated loading motor is driven to rotate the gear drive 15 counterclockwise, so that the arm lock 9 rotates clockwise to raise and engage the cam 9a with the arm 19a as shown in FIG. 6A.

Owing to this engagement, the arm 19a rotates clockwise to raise the arm 19b, so that the door 3 is moved and maintained at the open position (see FIG. 6A). When the cassette 2 further moves to a position near the loading position, the cam 9a is further raised and thus is disengaged from the arm 19a, so that the door 3 is closed.

When the cassette is to be ejected, the operation is performed oppositely to the above operation, and more specifically, the loading motor is driven in accordance with the cassette ejection instruction, so that the gear drive 15 rotates clockwise to rotate the arm 19a clockwise, whereby the cam 9a is lowered from the upper position and engages with the arm 19a to open the door 3 as shown in FIG. 6A. Thereafter, the cassette 2 reaches the ejection position, and the cam 9a is disengaged from the arm 19a. Since the cassette 2 stops when it is partially protruded beyond the door 3, it keeps the door 3 open. After the cassette 2 is ejected completely, the spring 19c elastically closes the door 3.

The door moving mechanism described above requires the arms 19a and 19b as well as the spring 19c, and further requires assembly of these parts and connection between the arm 19b and the door 3. Thus, it requires many parts to be assembled. Therefore, it is difficult to achieve a high assembly accuracy, and a long time is required for the assembly.

SUMMARY OF THE INVENTION

The present invention has been developed for overcoming the above-noted disadvantages, and it is an object of the invention to provide a cassette loading device which is formed of a small number of parts and can be easily assembled. Another object of the invention is to increase a mechanical strength of a part of a cassette loading device. Still another object of the invention is to provide a cassette loading device which includes door opening/closing means consisting of a small number of parts and improves an assembly accuracy.

A cassette loading device according to the invention includes a cassette housing for housing and moving a tape cassette to a predetermined position, and drive force transmitting means for transmitting the drive force supplied from a loading motor to the cassette housing, wherein spur gears forming the drive force transmitting means are fitted to bosses which are protruded from a side plate for carrying the cassette housing, and a cover member holding the drive force transmitting means is opposed to the side plate.

Since the drive force transmitting means for transmitting the drive force of the loading motor all consists of the spur gears, the cassette loading device can be assembled by such simple steps that the spur gears are fitted to the bosses and the cover member is attached thereto.

Also, a cassette loading device according to the invention includes a cassette housing for housing and moving a tape cassette to a predetermined position, a first spur gear being rotated by a loading motor, and a second spur gear which is driven by the first spur gear engaging with the same for rotating the cassette housing to the predetermined position by rotation through an angle smaller than 360 degrees, wherein the second spur gear has a stopper at a position between its own teeth, and the stopper has a top that is a surface and a height determined such that a tooth surface of the first spur gear pushes the top.

Also, the second spur gear has at a position between its own teeth, and the stopper has a surface substantially parallel to the peripheral of the second spur gear and a height determined such that a tooth surface of the first spur gear pushes a top of the stopper.

Accordingly, when the second spur gear makes one or more rotation, the tooth of the first spur gear radially pushes the top of the stopper or the surface parallel to the peripheral surface and does not act in the peripheral direction, so that the first spur gear does not idle, and the first spur gear can be stopped without passing over the stopper.

Further, a cassette loading device according to the invention includes a cassette housing for housing and moving a tape cassette to a predetermined position, a photosensor which detects a loading state of the tape cassette for turning on and off a power supply of a loading motor and detects a trailing end of the tape in accordance with various moving patterns of the tape cassette, a gear sense including a plurality of apertures, which are provided correspondingly to the moving patterns for passing a light beam to the photosensor, and moving means for moving the cassette housing in accordance with rotation of the gear sense.

Since the gear sense is provided with the apertures located only at the positions corresponding to the moving patterns such as loading, ejection, play, record, stop, forwarding and rewinding, a trailing end of the tape can be detected in accordance with various moving patterns of the tape cassette.

Further, a cassette loading device according to the invention includes a cassette housing for housing and moving a tape cassette to a predetermined position, drive force transmitting means for transmitting the drive force supplied from a loading motor to the cassette housing, moving means for moving said cassette housing by said drive force, and door opening/closing means, made of one part and having an engagement portion which engages with said moving means within a predetermined rotational range, for being operable to open and close a door provided at a loading inlet for said tape cassette in accordance with the moving range of said moving means, and said moving means fix said door moving means in the door close state during the operation of ejecting the tape cassette.

Additionally, in the cassette loading device according to the invention described above, the door opening/closing means turns upward to push the door upward for opening the door, and turns downward away from the door for closing the door.

Additionally, in the cassette loading device according to the invention described above, the moving means pushes downward said door opening/closing means at a position of ejection of the tape cassette.

Accordingly, the door opening/closing means is fixed at the door close state during the operation of ejecting the tape cassette, and thus it is not necessary to provide a spring, which is required for fixing the door opening/closing means in the prior art, so that the door opening/closing means of the integral type can be employed. Therefore, the door opening/closing means can be formed of a reduced number of parts. Further, the door is not connected to the door opening/closing means, which also reduces the number of parts of the door opening/closing means, and thus facilitates the assembly.

The above and further objects and features of the invention will more fully be apparent from the following detailed description with accompanying drawings.

DESCRIPTION OF THE PREFERRED EMBODIMENTS

Embodiments of the invention will be described below with reference to the drawings.

Figure 1:
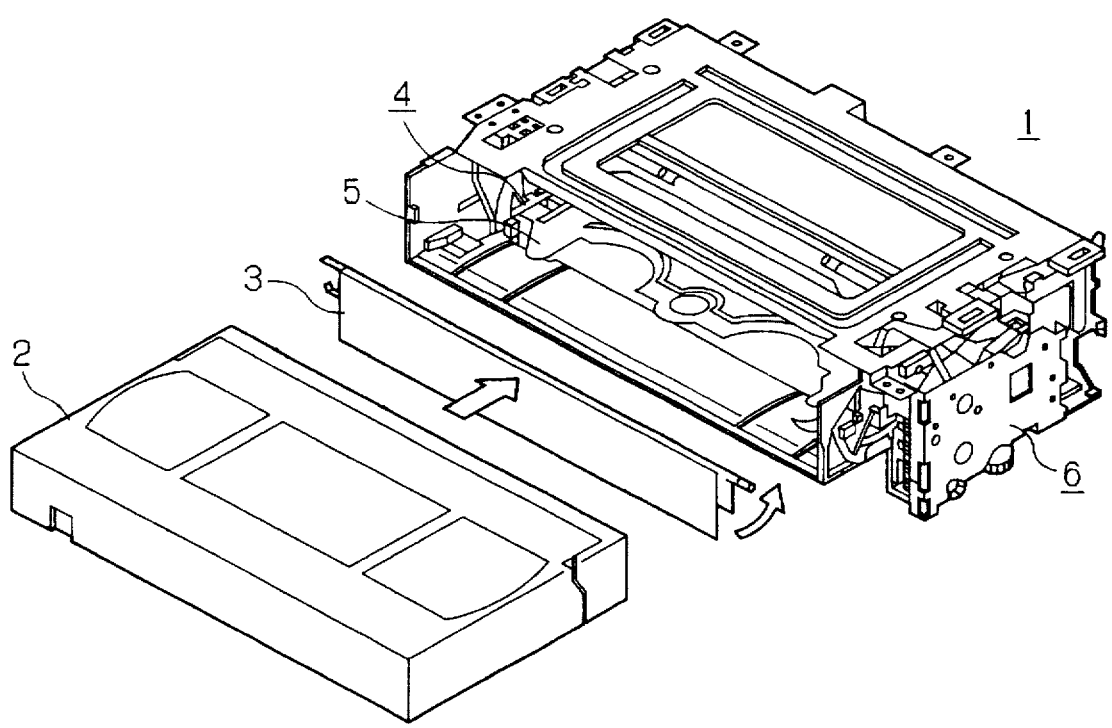
FIG. 1 is a perspective view of a conventional cassette loading device.
Figure 2:
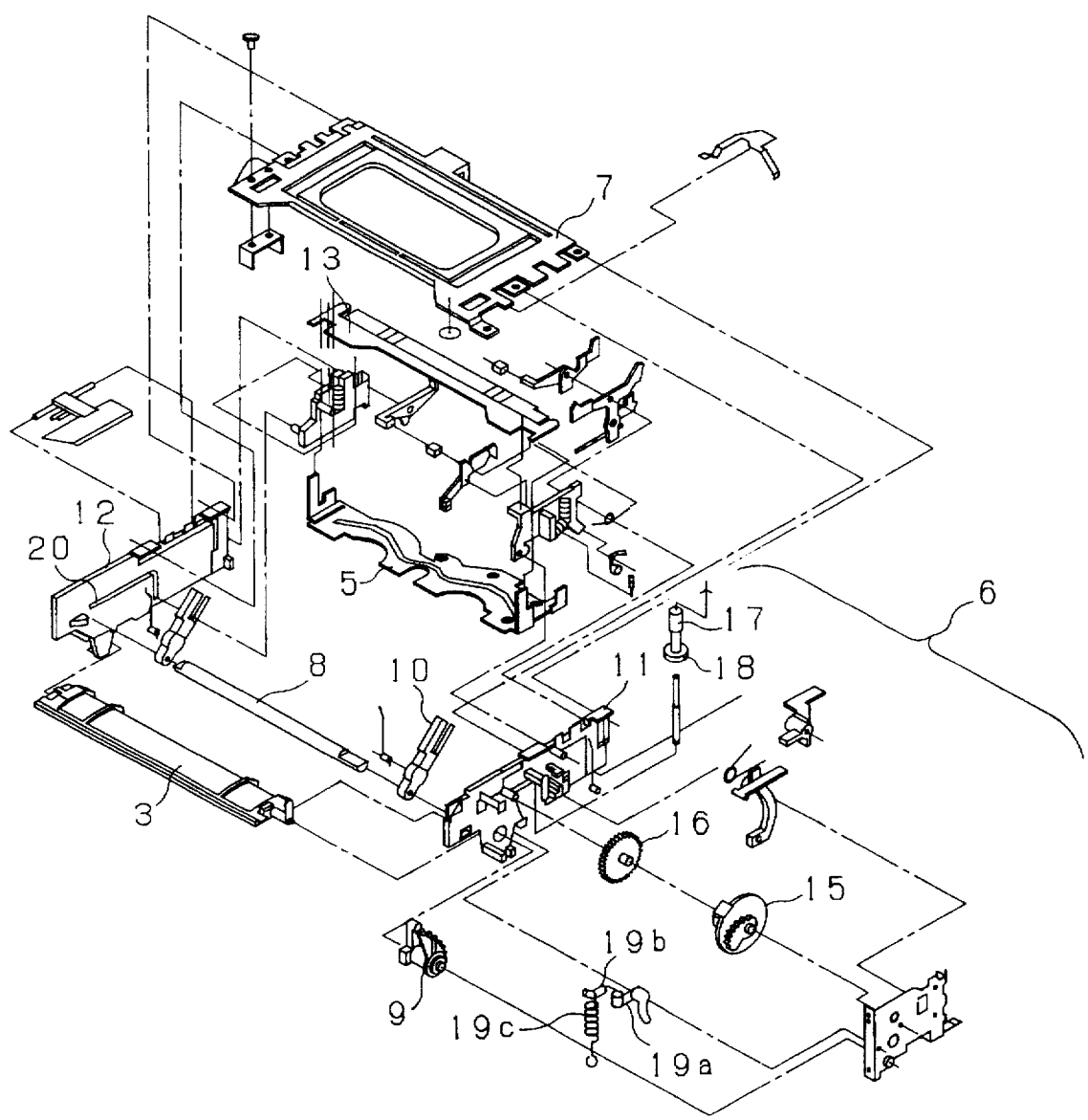
FIG. 2 is an exploded perspective view of the conventional cassette loading device.
Figure 3:
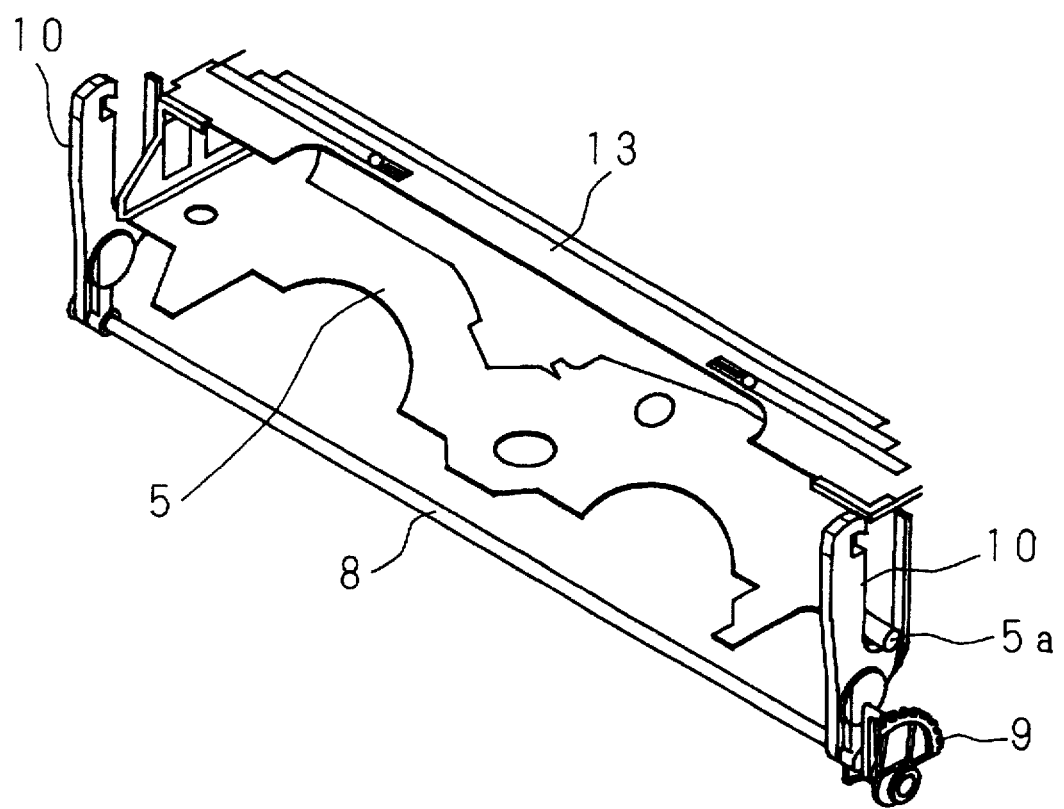
FIG. 3 is a perspective view of a movable part of the conventional cassette loading device.
Figure 4:
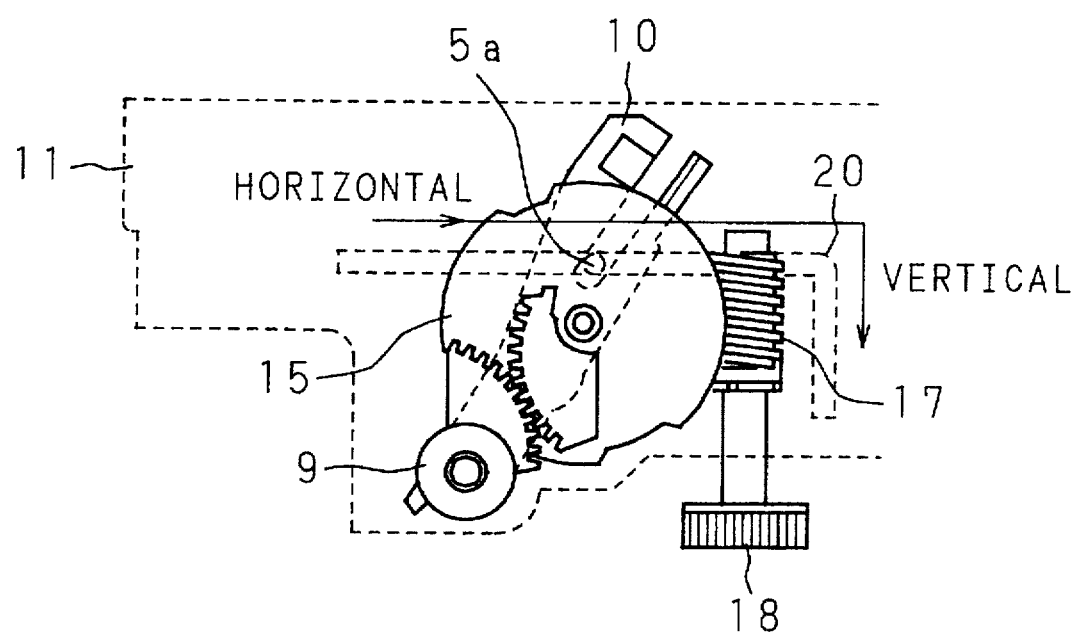
FIG. 4 is a side view showing a major portion of a conventional cassette housing drive.
Figure 5:
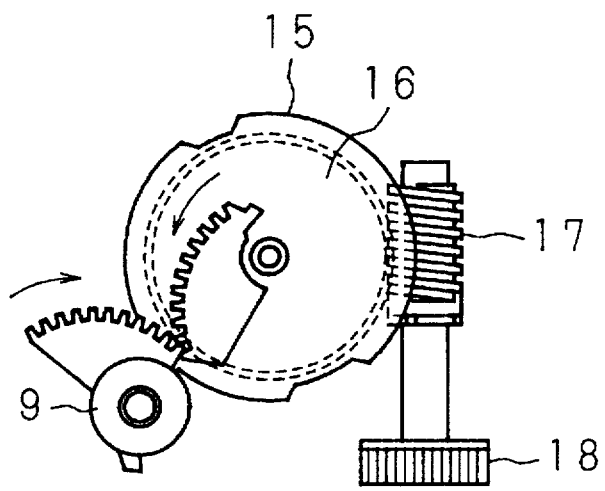
FIG. 5 is a side view showing a major portion of gears in FIG. 4.
Figure 6A:
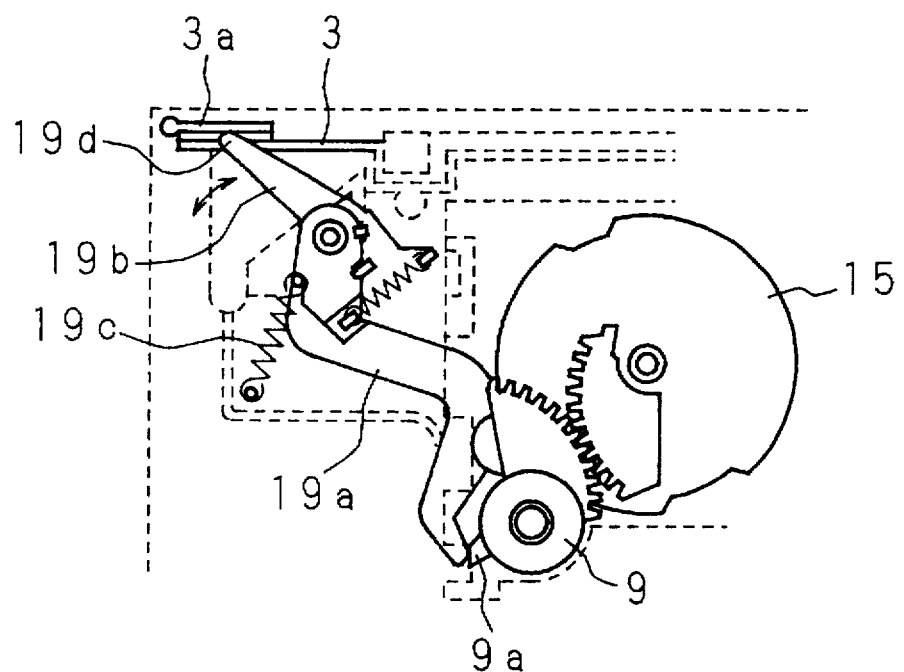
FIG. 6A is a side view showing a major portion of a conventional door moving mechanism in the door open state.
Figure 6B:
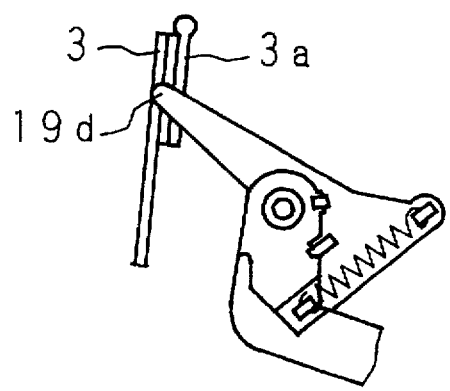
FIG. 6B is a side view showing a major portion of a conventional door moving mechanism in the door close state.
Figure 7:
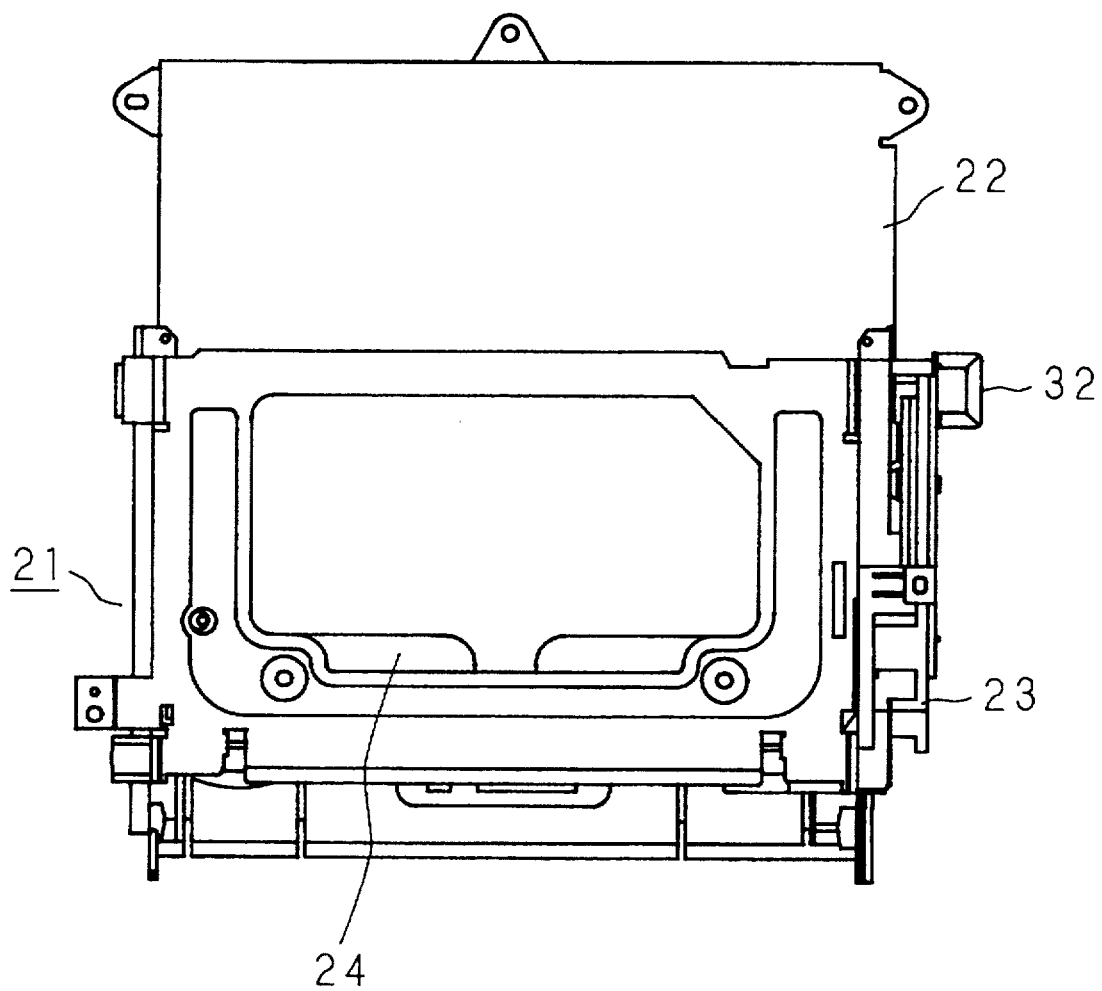
FIG. 7 is a plan of a cassette loading device of an embodiment of the invention.
Figure 8:
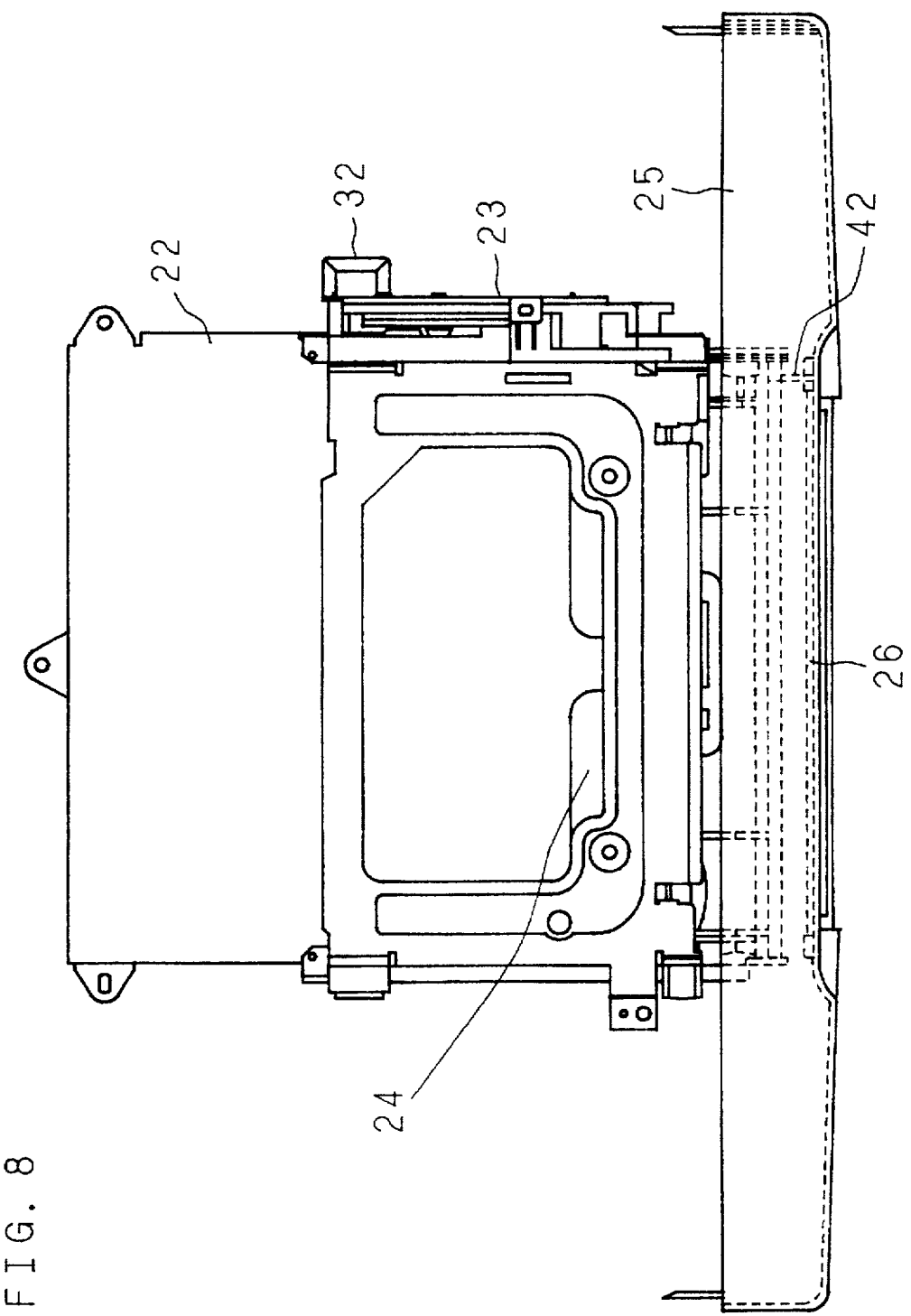
FIG. 8 is a plan of the cassette loading device in FIG. 7 together with a front panel attached thereto.
Figure 9:
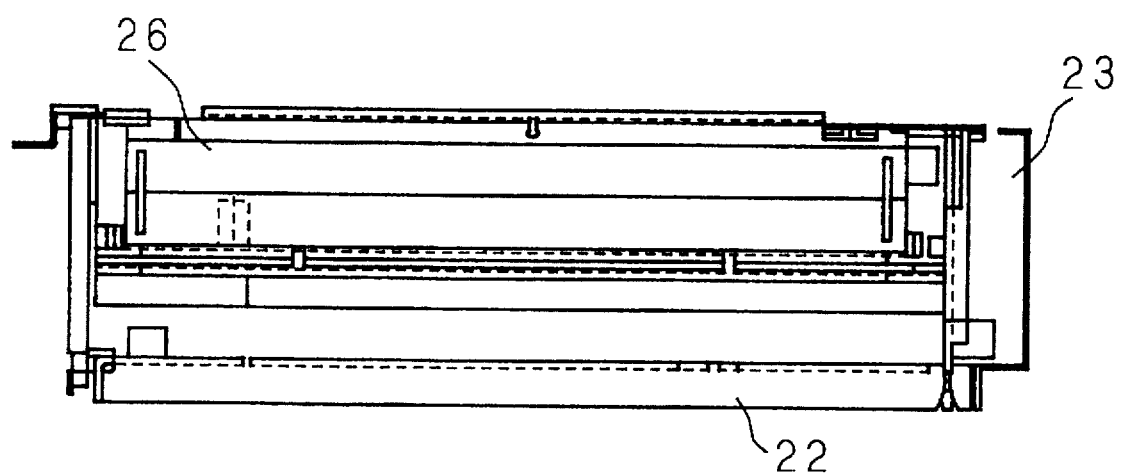
FIG. 9 is an elevation of the cassette loading device in FIG. 7.
Figure 10:
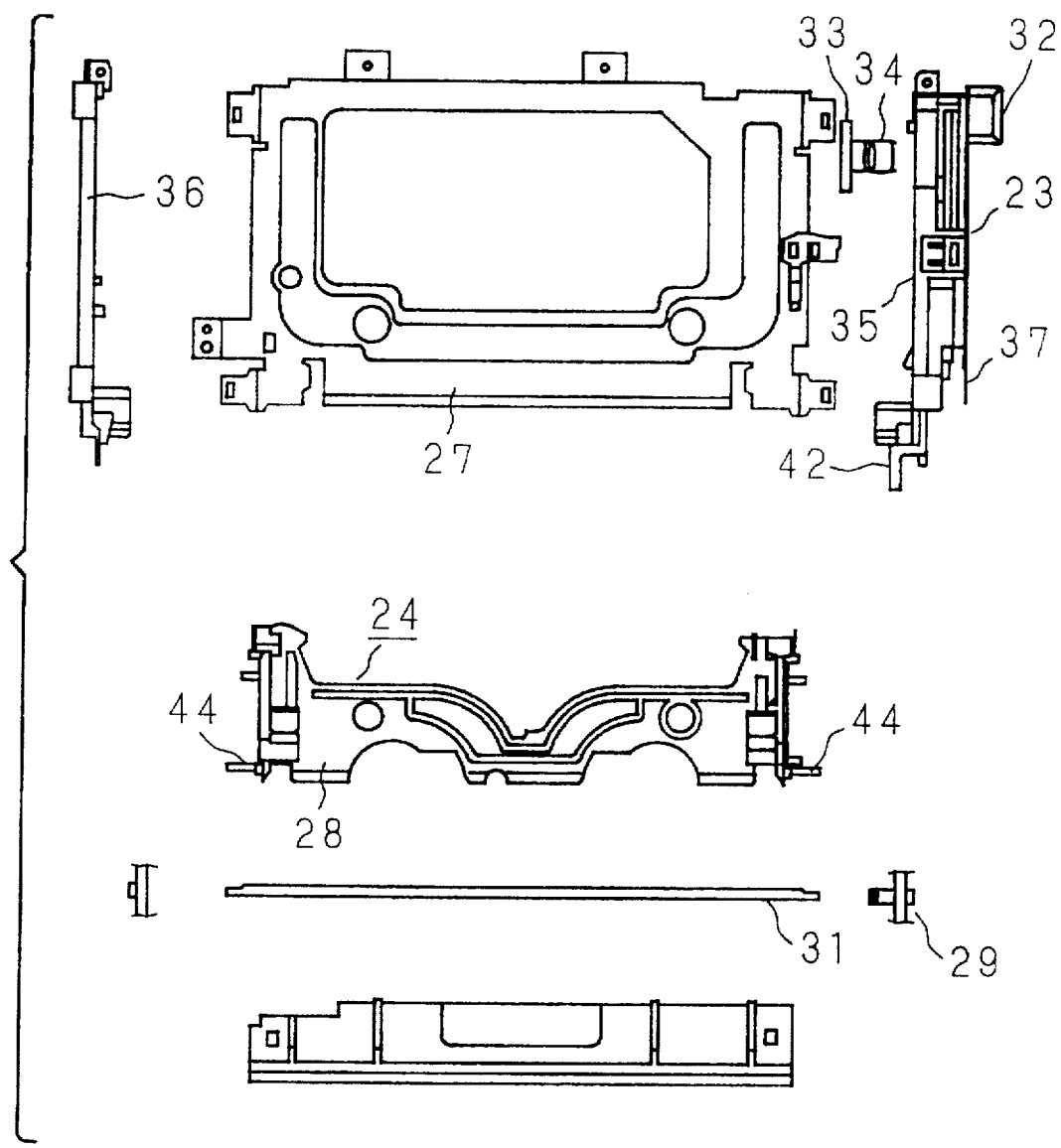
FIG. 10 is an exploded view of the cassette loading device in FIG. 7.
Figure 11:
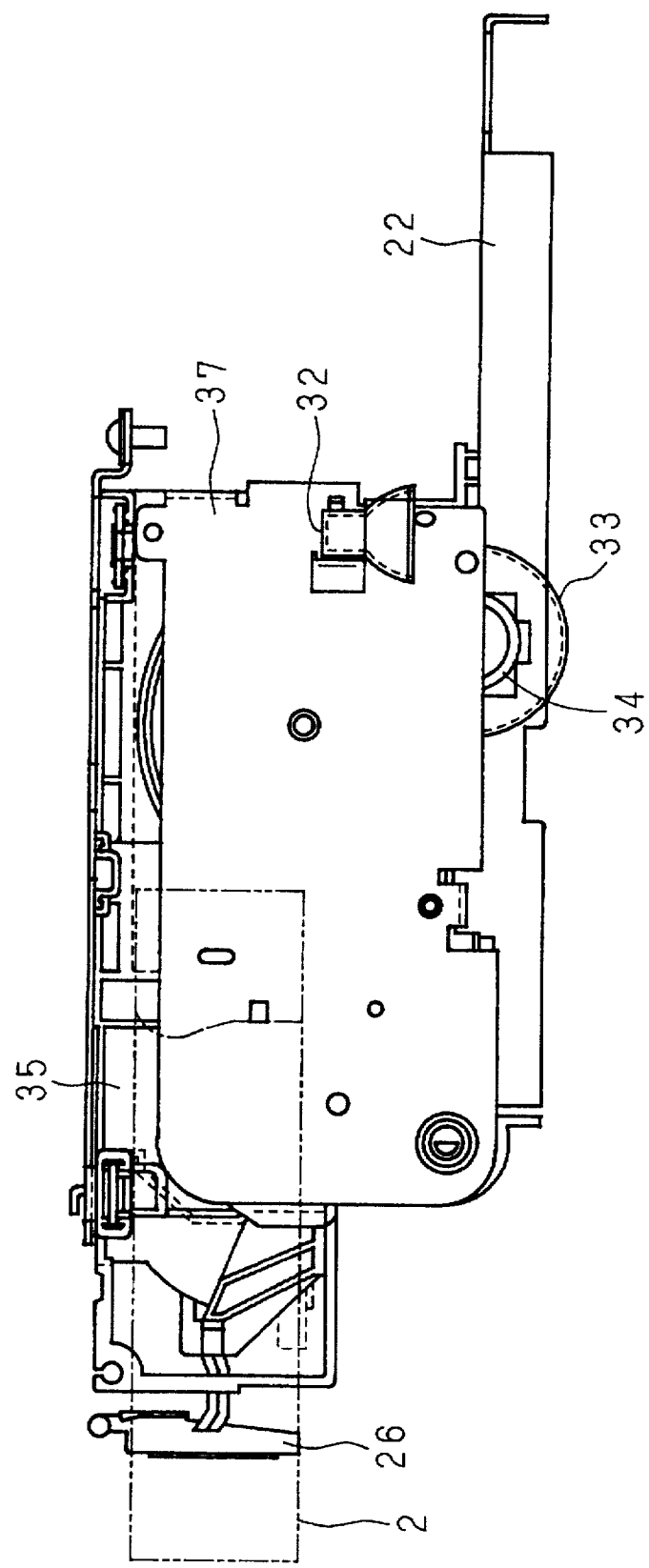
FIG. 11 is a side view of the cassette loading device in FIG. 7.

FIG. 7 is an elevation of a cassette loading device, FIG. 8 is a plan showing the cassette loading device in FIG. 7 together with a front panel attached thereto, FIG. 9 is an elevation of the structure in FIG. 7, FIG. 10 is an exploded view of the structure in FIG. 7, and FIG. 11 is a side view of the structure in FIG. 7.

In FIG. 7, "21" indicates a cassette loading device assembled on a main plate 22, and "23" indicates the drive force transmitting mechanism which is formed of spur gears and transmits the drive force of an unillustrated loading motor for performing operations such as loading and ejection of a cassette. A reference number "24" indicates a cassette housing which houses the cassette and is movable among positions such as a loading position and an ejection position. A reference number "32" indicates a photosensor housing of a photosensor which receives a light beam from an unillustrated light source for detecting a trailing end of tape. In FIG. 8, "25" indicates a front panel, "26" indicates a door, "42" indicates a door moving arm for opening and closing the door 26. In FIG. 10, "27" indicates a top plate, "28" indicates a bottom plate on which the cassette 2 is placed, and "29" indicates a synchronization gear carried on a shaft 31. A reference number "33" indicates a gear driven by the unillustrated loading motor. A reference number "34" indicates a drive gear which is coaxial to the gear 33 and applies the drive force to a gear of the drive force transmitting mechanism 23. A reference number "35" indicates a right side plate, "36" indicates a left side plate, and "37" indicates a cover for preventing dislocation of the gear 33 disposed in the drive force transmitting mechanism 23. A reference number "44" indicates a boss provided at each side of the bottom plate 28 and is moved for moving the cassette 2.

Figure 12:
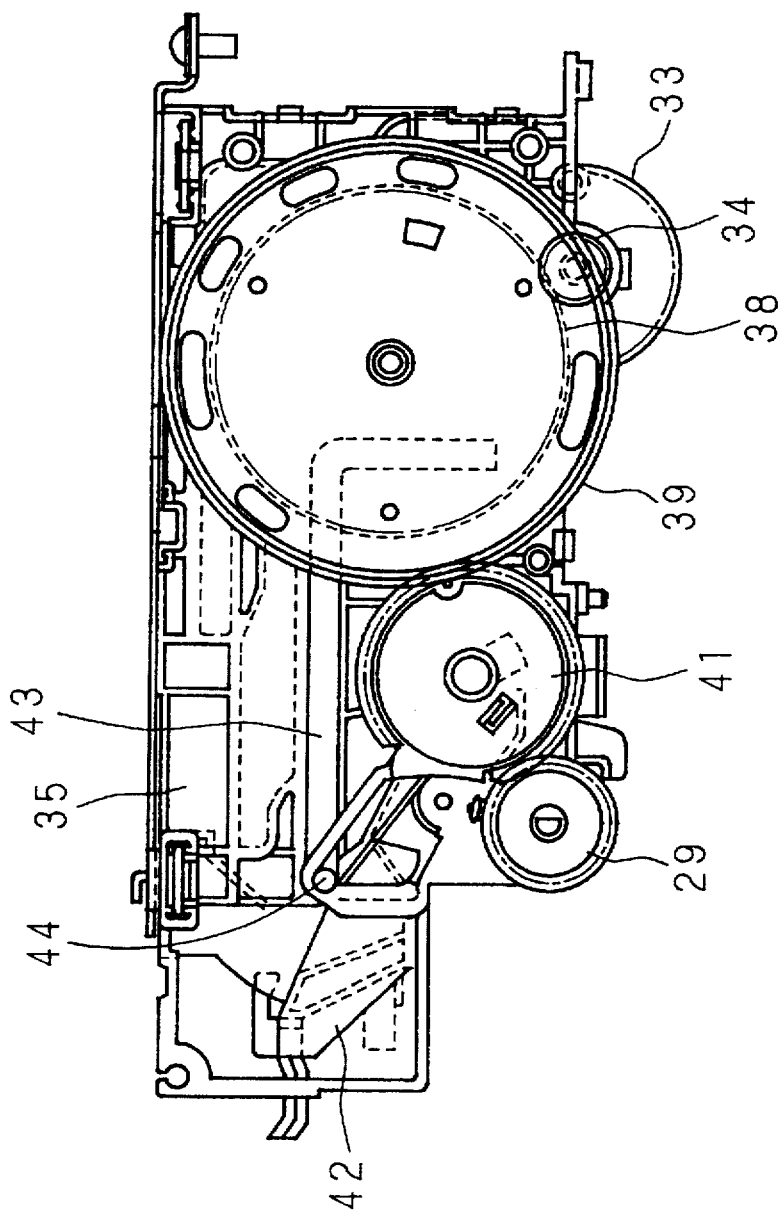
FIG. 12 is a side view of the drive force transmitting mechanism of an embodiment of the invention.
Figure 13:
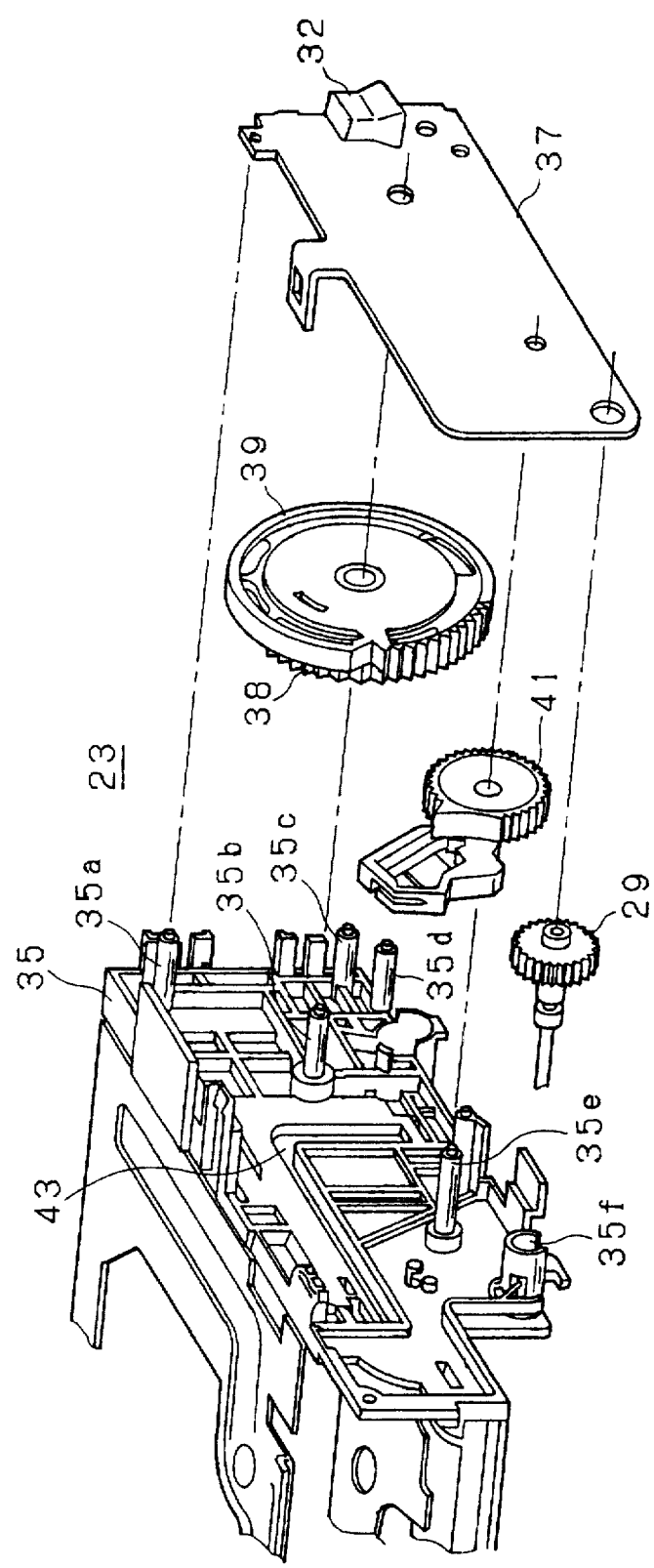
FIG. 13 is an exploded perspective view of the cassette loading device in FIG. 12.
Figure 14:
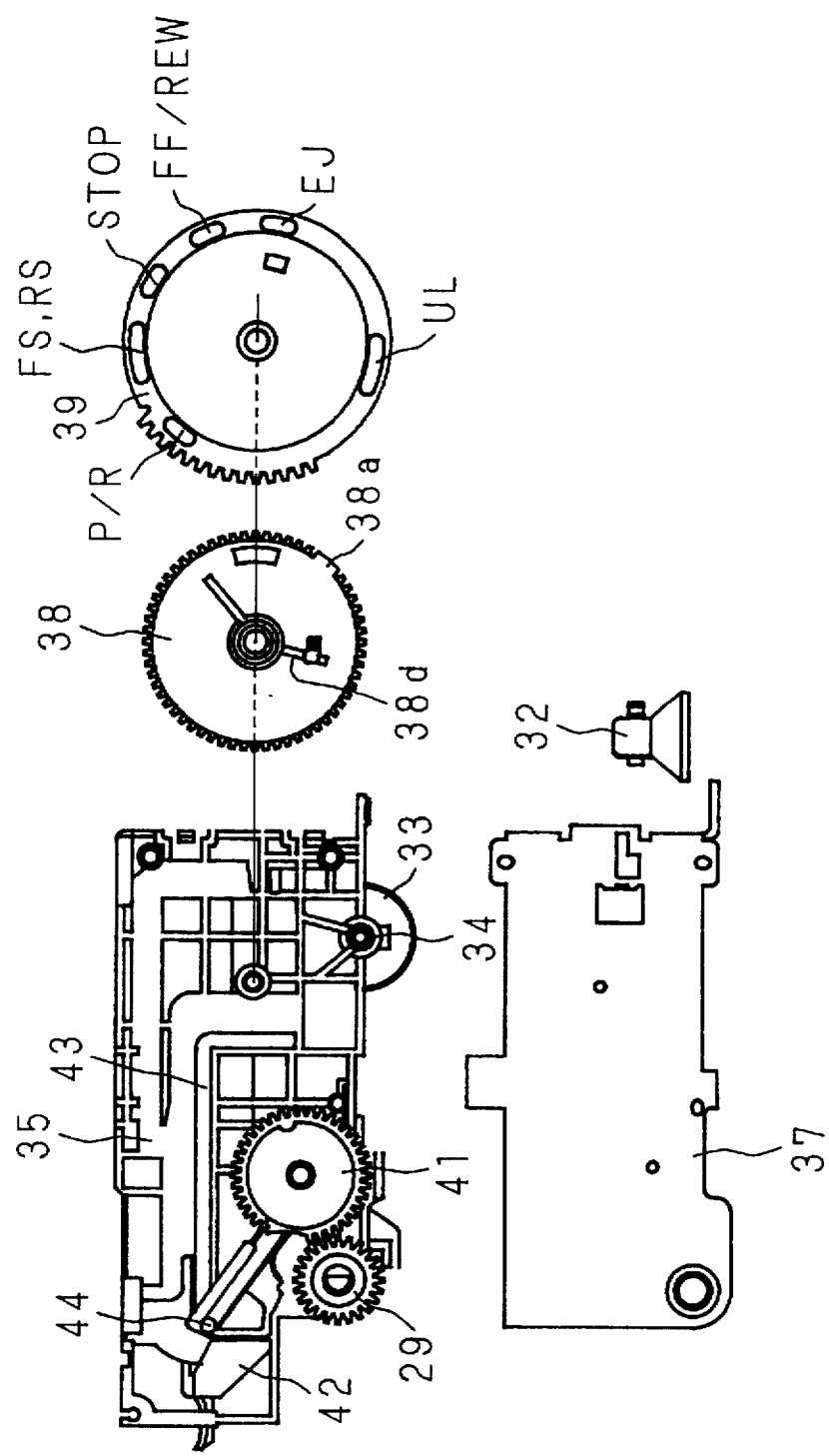
FIG. 14 is an exploded side view of the cassette loading device in FIG. 12.

FIG. 12 is a side view of the drive force transmitting mechanism. FIG. 13 is an exploded perspective view of the structure in FIG. 12, and FIG. 14 is an exploded side view of the structure in FIG. 12. In FIGS. 12, 13 and 14, 35a, 35b, 35c, 35d, 35e and 35f indicate bosses protruded from the right side plate 35, which are inserted into or fitted around the gear 38, gear sense 39, arm lock 41 and synchronization gear 29, and are also fitted to corresponding apertures in a cover 37 for fixing the cover 37. A reference number "38" indicates a gear driven by the drive gear 34, and is adapted to rotate within a range smaller than 360 degrees in accordance with moving patterns such as play/record and forwarding/rewinding. A reference number "39" indicates a gear sense which is arranged rotatably and coaxially to the gear 38, and is rotated by the gear 38 via a spring 38d in FIG. 14. The gear sense 39 rotates within a range smaller than 360 degrees.

A reference number "41" indicates an arm lock (i.e., arm for loading the cassette) which is provided with a gear and an arm, and is driven by the gear sense 39 to move the boss 44 along a guide groove 43 provided at the right side plate 35 for loading or ejecting the cassette 2. Also, it drives the synchronization gear 29 to move the unillustrated boss along a guide groove provided at the left side plate 36. A reference number "42" indicates a door moving arm for opening and closing the same.

In the steps for assembling the drive force transmitting mechanism thus constructed, as shown in FIG. 13, the bosses 35a, 35b, 35c, 35d, 35e and 35f are provided at the right side plate 35, and are fitted into or around the gear 38, gear sense 39, arm lock 41 and synchronization gear 29 as well as the cover 37 for preventing axial dislocation thereof. Only by these steps, the assembly of the drive force transmitting mechanism 23 is completed. As described above, only by the steps in which the drive members such as gears and arms, i.e., various drive force transmitting members are fitted to the bosses and the cover is attached thereto, the assembly of the drive force transmitting mechanism is completed, so that the assembly can be performed readily within a short time, resulting in improvement of workability.

Meanwhile, in FIG. 14, the gear 38 is driven by the drive gear 34 to rotate through an angle less than 360 degrees in accordance with the moving patterns such as play/record and forwarding/rewinding. However, the gear 38 may rotate beyond an intended rotational range when a control circuit is adjusted or a trouble occurs in the control circuit. In this case, if the gear 38 were formed of an ordinary gear provided at its entire periphery with teeth, the drive gear 34 would drive the gear 38 to make many rotations, so that the phases of the gears 38 and 34 which had been adjusted would shift from correct phases corresponding to the moving patterns.

In view of the above, a stopper 38a is arranged between the teeth corresponding to the rear end of the rotational range of the gear 38, so that the stopper 38a may prevent the gear 38 from rotation beyond the intended rotational range and may also prevent idling of the drive gear 34.

Figure 15A:
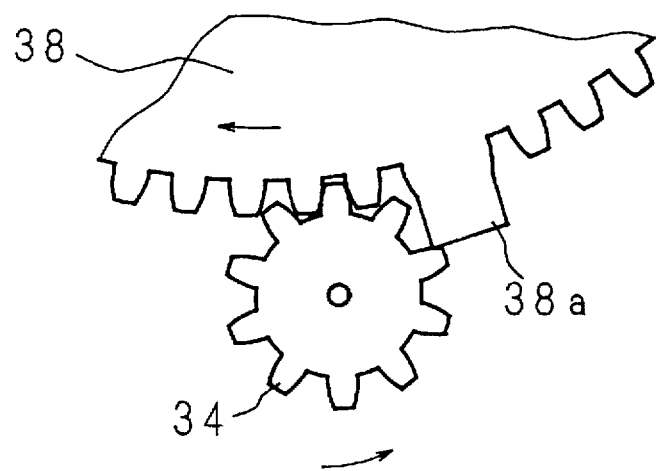
FIG. 15A shows a structure and an operation of a gear stopper of an embodiment of the invention.
Figure 15B:
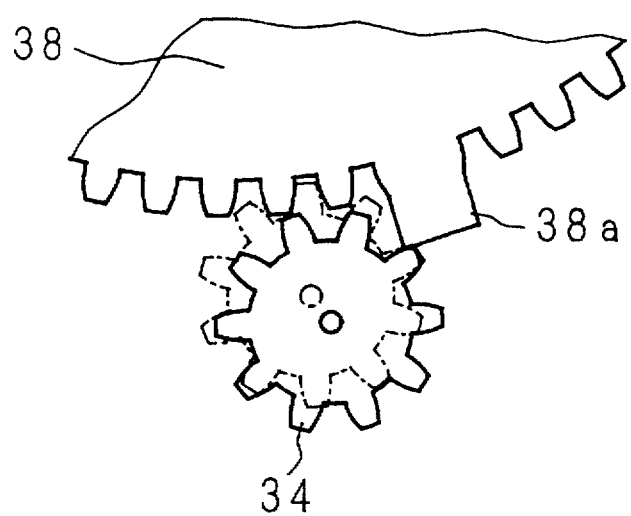
FIG. 15B shows a structure and an operation of a gear stopper of an embodiment of the invention.

FIGS. 15A and 15B show the stopper 38 of the embodiment. The stopper 38a has a top surface and an appropriate height which allows a tooth surface of the drive gear 34 to push the top. The stopper 38a in FIG. 15A is in the state where the tooth of the drive gear 34 is in contact with the stopper 38a, and the tooth surface of the drive gear 34 pushes the top of the stopper 38a to stop the rotation. FIG. 15B shows a state where the shaft is bent or dislocated. In this case, the central axis is shifted correspondingly to erroneous disengagement of the teeth, and the tooth tends to pass over the stopper 38a. However, the tooth surface of the drive gear 34 pushes the top of the stopper 38a to stop the rotation. As described above, owing to provision of the stopper 38a having the height which allows the tooth surface of the drive gear 34 to push the top of the stopper 38a, the pushing force is applied in the radial direction to the gear 38 and is hardly applied thereto in the circumferential direction to produce rotation force, so that the drive gear 34 surely stops. By preventing the idling of the drive gear 34, it is possible to prevent the rotation of the gear 38 beyond the intended rotation range.

Figure 16A:
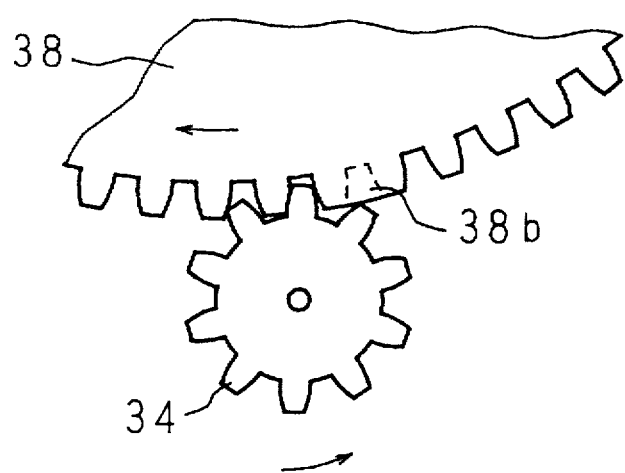
FIG. 16A shows a structure and an operation of the structure in FIGS. 15A and 15B before improvement.
Figure 16B:
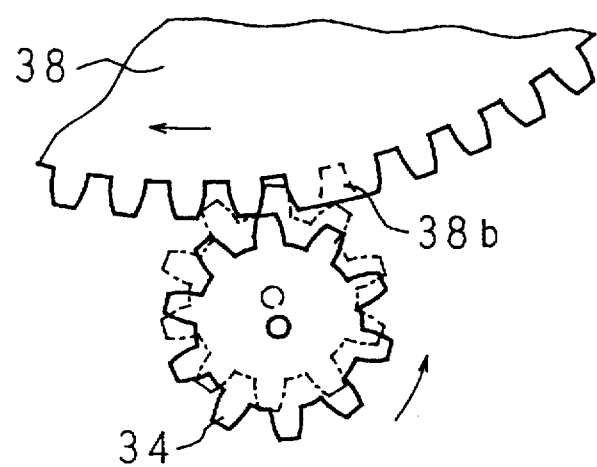
FIG. 16B shows a structure and an operation of the structure in FIGS. 15A and 15B before improvement.

FIGS. 16A and 16B show the stopper which is not improved. As shown in FIG. 16A, a stopper 38b is formed by filling a space between the teeth of the gear 38. According to this structure, the drive gear 34 having a shifted central axis may idle as shown in FIG. 16B, resulting in shift of the phases of the gears. The tooth which passes over the stopper 38b will engage the subsequent teeth without preventing the rotation.

Figure 17A:
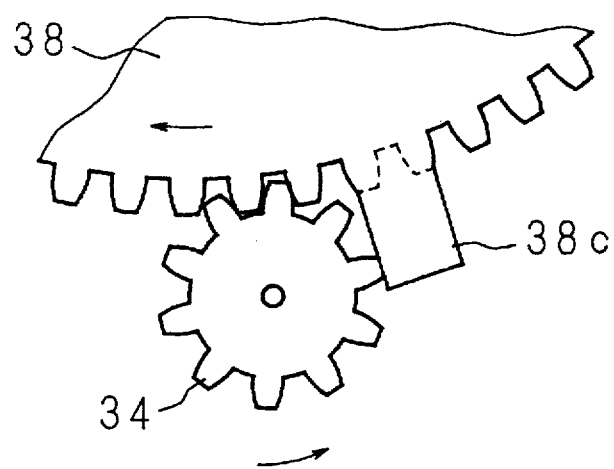
FIG. 17A shows a structure and an operation of the structure in FIGS. 15A and 15B before improvement.
Figure 17B:
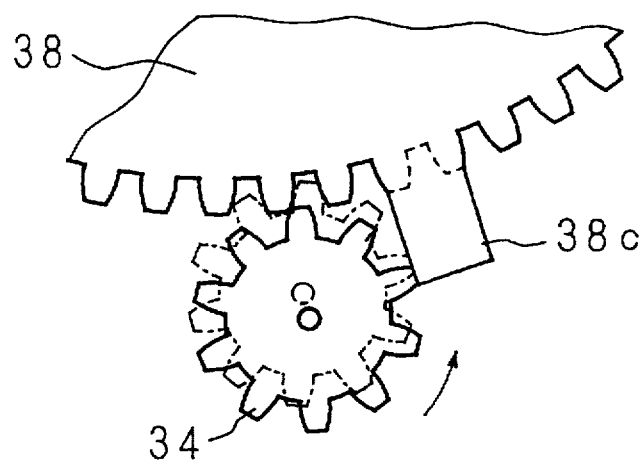
FIG. 17B shows a structure and an operation of the structure in FIGS. 15A and 15B before improvement.

Meanwhile, according to another unimproved stopper shown in FIGS. 17A and 17B, the stopper 38c has an excessively high top, so that the teeth of the drive gear 34 do not pass over the stopper 38c as shown in FIG. 17B, and thus the gear 38 is surely stopped. However, the drive gear 34 may idle without engaging the tooth tops of the gear 38, resulting in shift of the phases. Accordingly, the stopper 38a in FIGS. 15A and 15B has the optimum structure for preventing the rotation.

Figure 18:
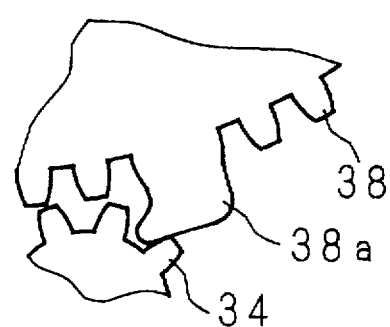
FIG. 18 shows a structure and an operation of a gear stopper of another embodiment of the invention.

FIG. 18 shows the stopper of another embodiment, in which the stopper 38a has a surface substantially parallel to the peripheral surface of the gear 38, and has an edge portion which protrudes forwardly in the rotating direction for increasing an area of the surface to be pushed by the drive gear 34. This ensures the stop of rotation of the gear 38. Also in this embodiment, the height of the stopper 38a is determined such that the tooth surface of the drive gear 34 pushes the stopper 38a in the radial direction.

Figure 19:
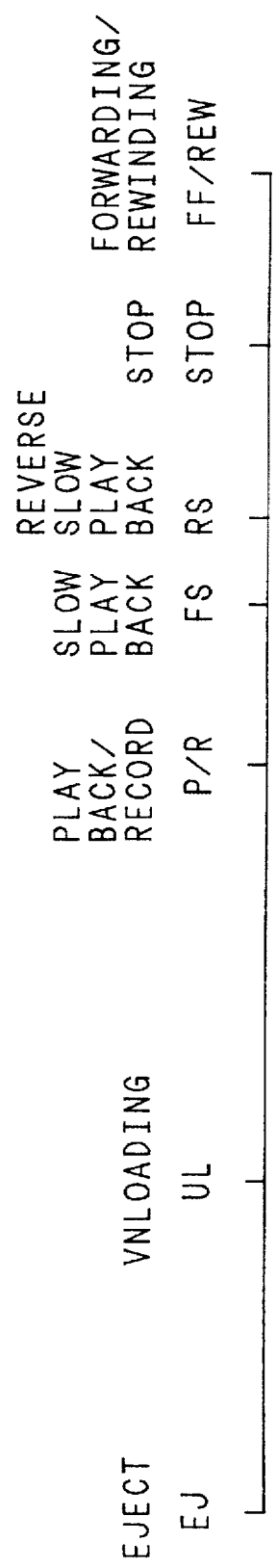
FIG. 19 is a development showing the position of apertures in a gear sense of an embodiment of the invention.

In FIG. 14, apertures formed at the gear sense 39 have configurations corresponding to various moving patterns such as EJ, UL, P/R, RS, FS, STOP and FF/REW. FIG. 19 is a development showing the moving patterns. Light beams emitted from the unillustrated light source pass through these apertures and are received by the photosensor disposed in the photosensor housing 32 (see FIG. 7). Since, a trailing end of the tape can be detected in accordance with various moving patterns of the tape cassette.

Figure 20:
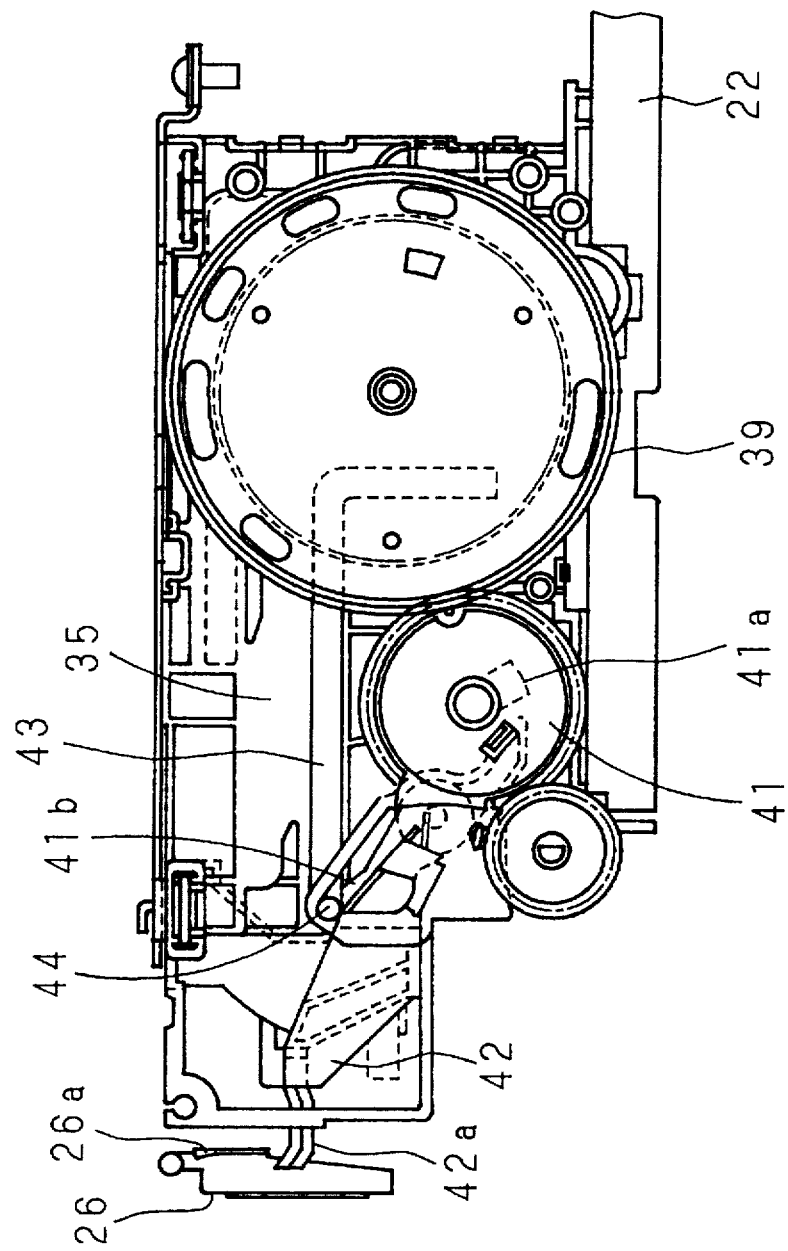
FIG. 20 is a side view showing a structure of a door moving mechanism of an embodiment of the invention.
Figure 21:
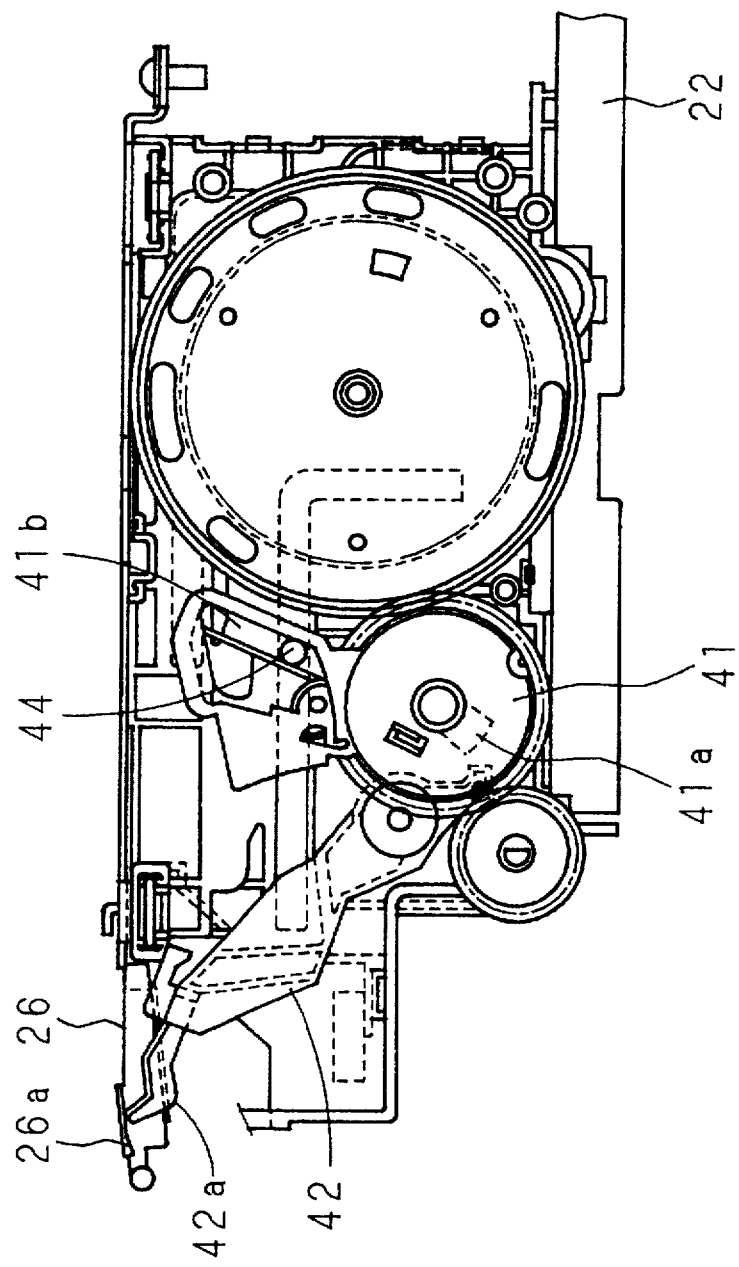
FIG. 21 is a side view showing a structure of the door moving mechanism of an embodiment of the invention.

FIGS. 20 and 21 are side views showing the structure of the door moving mechanism. FIG. 20 shows a state where the door 26 is closed and the cassette is not loaded. FIG. 21 shows a state where the door 26 is open and the cassette is being loaded or ejected. In FIG. 20, the arm lock 41 has a cam 41a, and the lower end of the door moving arm 42 is not engaged with the cam 41a, so that the door moving arm 42 is lowered by its own weight to locate its end 42a at the lower position. In this state, the boss 44 is located above the door moving arm 42 to prevent upward motion of the door moving arm 42.

Then, the operation of loading the cassette will be described below. As shown in FIG. 21, the cassette which is being inserted pushes the door 26 upward, and simultaneously, the unillustrated loading motor is driven to turn the arm lock 41 clockwise to engage the cam 41a with the door moving arm 42. The end 42a rises to move an arm engagement 26a, which is provided at an end of the door 26, upward, so that the door is held at the open position. When the arm lock 41 further turns clockwise to the loading position of the cassette, the raised cam 41a disengages from the door moving arm 42, so that the end 42a of the door moving arm 42 lowers and the door 26 is closed.

Then, the operation of ejecting the cassette is performed oppositely to the above loading operation, and in other words, is performed to attain the state shown in FIG. 20 through the state shown in FIG. 21. According to the door moving mechanism thus constructed, the door moving arm requires only one part for its function and does not require a part such as a spring, and also it is not necessary to provide a part for connection between the door and the door moving arm in contrast to the prior art. Further, when the cassette is ejected, the boss 44, of which primary purpose is to move the cassette, is utilized to prevent the upward motion of the door moving arm 42, so that the end 42a does not rise. Thereby, it is possible to prevent contact of the end 42a in the raised or floated position with the door engagement portion 26a when attaching the front panel.

Figure 22A:
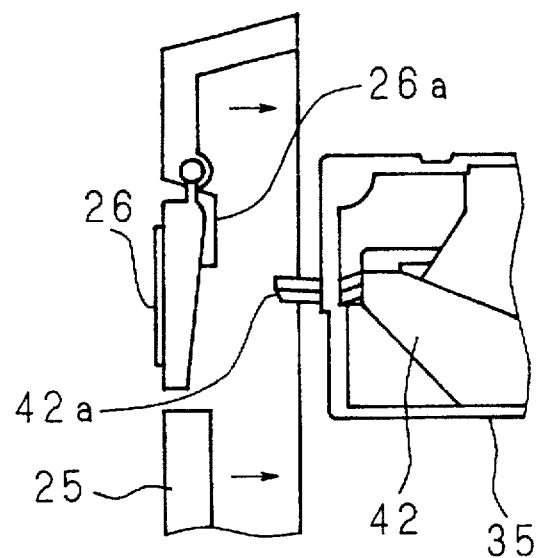
FIG. 22A shows a relationship in assembly between the door moving mechanism and a front panel of an embodiment of the invention.
Figure 22B:
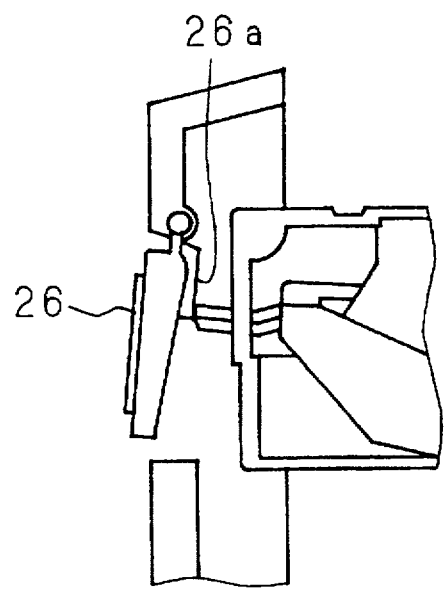
FIG. 22B shows a relationship in assembly between the door moving mechanism and the front panel of an embodiment of the invention.

FIG. 22 shows the relationship between the door moving mechanism and the front panel during assembly. FIG. 22A shows a state where the front panel 25 is being assembled, and particularly, the front panel 25 is being pushed in the direction indicated by arrow toward the assembly position shown in FIG. 20. In this step, if the end 42a were raised and maintained at the floating position, the end 42a of the door moving arm 42 would contact with the door engagement portion 26a as shown in FIG. 22B. In the illustrated embodiment, however, the boss 44 is utilized to prevent the rise of the door moving arm 42 as shown in FIG. 20, so that the assembly is not impeded.

In the embodiment described above, the boss 44 is used for preventing the upward motion of the door moving arm 42. However, the arm lock 41 may be used instead of the boss 44 for directly preventing the upward motion of the door moving arm 42. Thus, the arm for the loading may be used to prevent the upward motion of the door moving arm.

According to the invention, as described hereinbefore, the structure can be assembled through such simple steps that the spur gears for transmitting the drive force are fitted to the bosses protruded from the side plate, and the cover for preventing dislocation of the spur gears are fixed. Therefore, the assembly time can be reduced.

Further, the stopper for preventing rotation of the spur gear is operable to prevent the spur gears for transmitting the drive force from rotating beyond a predetermined rotational range, and for this purpose, the stopper has such a height that the tooth surface of the drive gear pushes the top of the stopper. Therefore, the drive gear is prevented from idling and passing over the stopper, and thus rotation of both the gears can be stopped reliably.

Since the apertures of the gear sense through which the light beams pass are formed only at the positions required in accordance with the moving patterns, it is possible to detect a trailing end of the tape in accordance with various moving patterns of the tape cassette.

The door moving arm is formed of one member, and a part for connecting the same to the door is not required, so that the parts are reduced in number and the assembly is facilitated. Since stopper means is provided for preventing the upward motion of the door moving arm when the loading arm is at the cassette ejection position, it is possible to prevent engagement of the front panel with the door moving arm during the assembly of the front panel.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A cassette loading device for loading and ejecting a tape cassette comprising:
   a cassette receiving housing moving said tape cassette between an ejected position and a loaded position;
   a first gear having a first plurality of teeth formed continuously along a circumference thereof, said first gear being operatively connected to one of said cassette receiving housing and a motor;

a second gear having a second plurality of teeth formed continuously along a circumference thereof to transmit force from said motor to said cassette receiving housing to move said cassette receiving housing, said second gear being operatively connected to the other of said cassette receiving housing and said motor, and said second plurality of teeth meshing with said first plurality of teeth; and a stopper circumferentially aligned with said first plurality of teeth when viewed from a direction perpendicular to a rotational axis of said first gear, said stopper having a height determined such that at least one of said second plurality of teeth engages with said stopper to terminate transmission of said force from said motor to said cassette receiving housing.

2. A cassette loading device for loading and ejecting a tape cassette comprising:

a cassette receiving housing which moves said tape cassette between an ejected position and a loaded position; and at least first and second gears meshing with each other, one of said at least first and second gears being operatively connected to said cassette receiving housing and the other of said at least first and second gears being operatively connected to a motor to transmit force from said motor to said cassette receiving housing to move said cassette receiving housing, said first gear having a first plurality of teeth formed continuously along a circumference thereof and a stopper circumferentially aligned with said first plurality of teeth when viewed from a direction perpendicular to a rotational axis of said first gear, and said second gear having a second plurality of teeth formed continuously along a circumference thereof, at least one of said second plurality of teeth engaging with said stopper to terminate transmission of said force from said motor to said cassette receiving housing.

3. A cassette loading device of claim 2, further comprising:

a side plate supporting said cassette receiving housing; and a plurality of bosses protruding from said side plate for rotatably supporting said first and second gears.

4. A cassette loading device of claim 3, further comprising:

a cover member which is opposed to said side plate for rotatably supporting one of said first and second gears therebetween.

5. A cassette loading device of claim 3, further comprising:

door opening/closing means mounted on said side plate, said door opening/closing means being rotatable to an open state for opening a door provided at a loading inlet for said tape cassette and to a close state for closing said door; wherein one of said first and second gears engages with said door opening/closing means to rotate said door opening/closing means to said open state and maintains said door opening/closing means at said close state when said cassette receiving housing is at said ejected position.

6. A cassette loading device of claim 5, wherein said one of said first and second gears includes a projection engageable with said door opening/closing means for forcing said door opening/closing means at said close state when said cassette receiving housing is at said ejected position.

7. A cassette loading device of claim 5, wherein said door opening/closing means is operable to turn upward and push said door upward for opening said door in accordance with rotation of said one of said first and second gears; and is operable to turn downward away from said door by virtue of its own weight for closing said door.

8. A cassette loading device according to claim 2, wherein said first and second gears include spur gears.

9. A cassette loading device of claim 2, further comprising:

a gear sense mounted on one of said first and second gears, said gear sense having a plurality of apertures corresponding to a plurality of positions of said cassette receiving housing; and a photosensor detecting a position of said cassette receiving housing among said plurality of positions by receiving a light passing through one of said plurality of apertures to control a power supplied to said motor.

10. A cassette loading device of claim 2, wherein said one of said second plurality of teeth engages with said stopper by pressing said stopper in a radial direction of said first gear.

11. A cassette loading device of claim 2, wherein said stopper includes a top surface substantially parallel to said circumference of said first gear, and said one of said second plurality of teeth engages with said top surface.

12. A cassette loading device of claim 11, wherein a height of said stopper is substantially the same as said first plurality of teeth.

13. A cassette loading device of claim 2, wherein said stopper includes a side surface substantially in alignment with a radial direction of said first gear and has a height greater than a radius of said second gear, and said one of said second plurality of teeth engages with said side surface.

14. A cassette loading device of claim 13, wherein said stopper has an edge portion protruding from a side of said stopper to extend a length of a top surface in a direction in alignment with said first plurality of teeth.

15. A cassette loading device of claim 2, wherein said stopper extends outwardly from at least one of said first plurality of teeth in a radial direction of said first gear, and one of said second plurality of teeth extending outwardly in a radial direction of said second gear engages with said stopper to terminate transmission of said force.

* * * * *